May 11, 1937.  J. R. YOTTA  2,079,892
MEAT CHOPPING MACHINE
Filed May 23, 1936   2 Sheets-Sheet 1

INVENTOR.
Jean R. Yotta

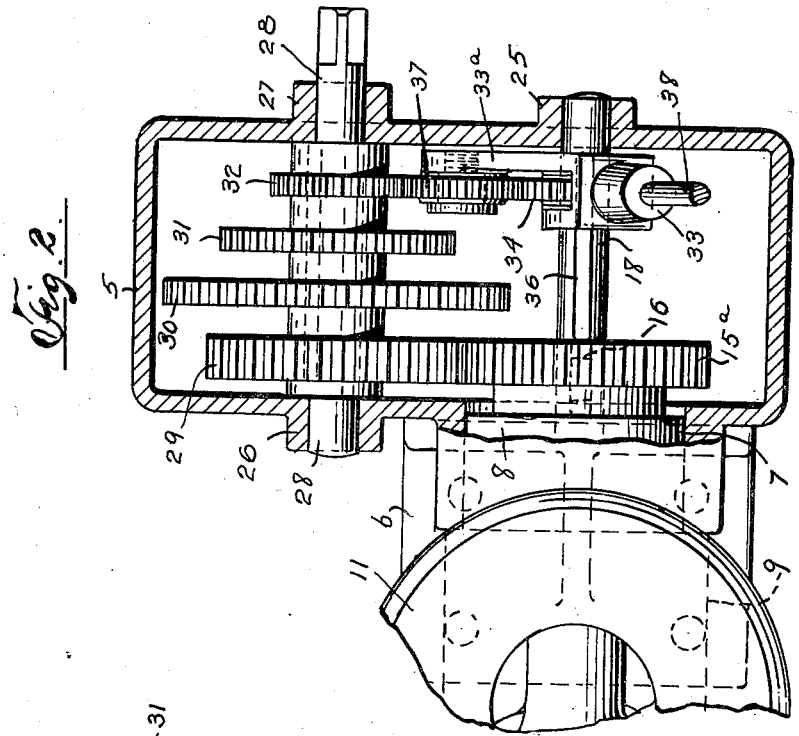
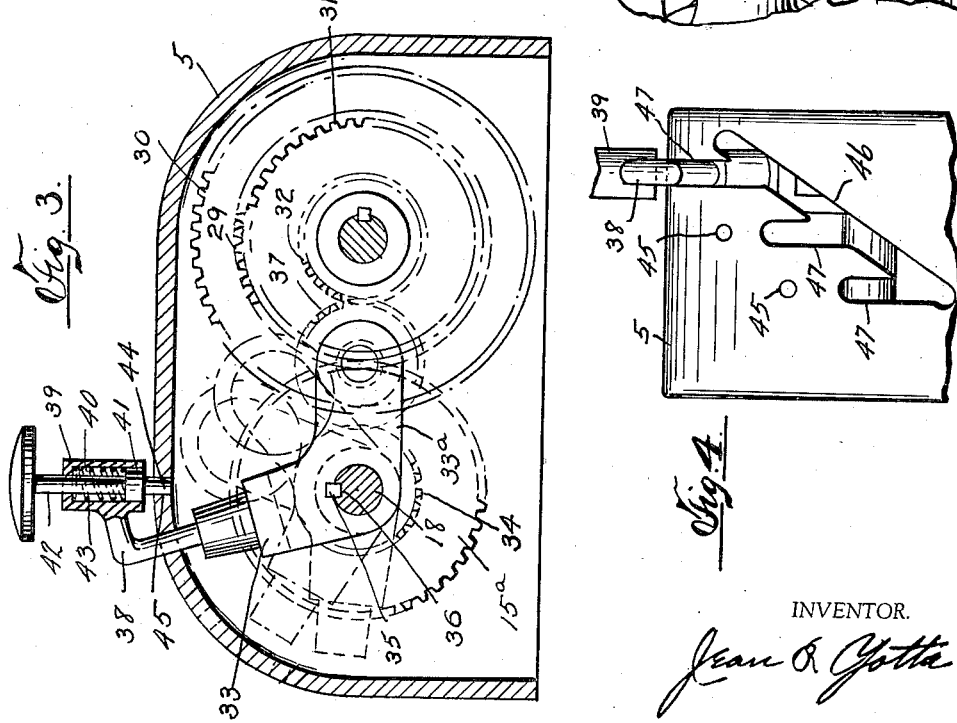

Patented May 11, 1937

2,079,892

UNITED STATES PATENT OFFICE 2,079,892

MEAT CHOPPING MACHINE

Jean R. Yotta, Los Angeles, Calif.

Application May 23, 1936, Serial No. 81,343

4 Claims. (Cl. 146—182)

My invention relates primarily to food cutting machines, and particularly for chopping meat into fine particles.

In the construction of the present type of meat chopping machines a feed screw is provided for feeding the meat to a rotating knife and forcing it through a perforated plate, and in the use of this type of machine sufficient pressure is necessary to force the meat through the perforations and to the knife so that all of the juices of the meat are squeezed out and run off and are wasted thus destroying the palatability of the meat as well as greatly, if not totally destroying the nutritious value thereof.

It is the prime object of my invention to provide a machine for chopping meat in which the meat is cut or chopped into the desired fineness and extruded through a perforated plate without excess pressure whereby the juices and nutritive value thereof are retained unimpaired.

Another object is to provide means, in a device of the above character, for varying the comminution of the meat to suit the desires of the user.

A still further object is to provide a device of the foregoing character which will be simple in construction and operation and of a maximum efficiency, and in which the variation of the degree of fineness into which the meat is chopped may be easily and quickly adjusted by the user of the machine with a minimum of effort and without the necessity for special knowledge or skill.

Other objects and advantages will appear hereinafter and, while I have shown and will describe the preferred form of my invention, I wish it to be specifically understood that I do not limit myself to such preferred form, but that various changes and adaptations may be made therein without departing from the spirit of my invention.

In the drawings accompanying and forming a part hereof:

Fig. 2 is a fragmentary top plan, partly in section, of Fig. 1.

Fig. 3 is a section on the line 3—3 of Fig. 1.

Fig. 4 is a side elevation of the outer face of the gear housing, showing the means of making the gear changes to vary the cutting.

Figure 1:
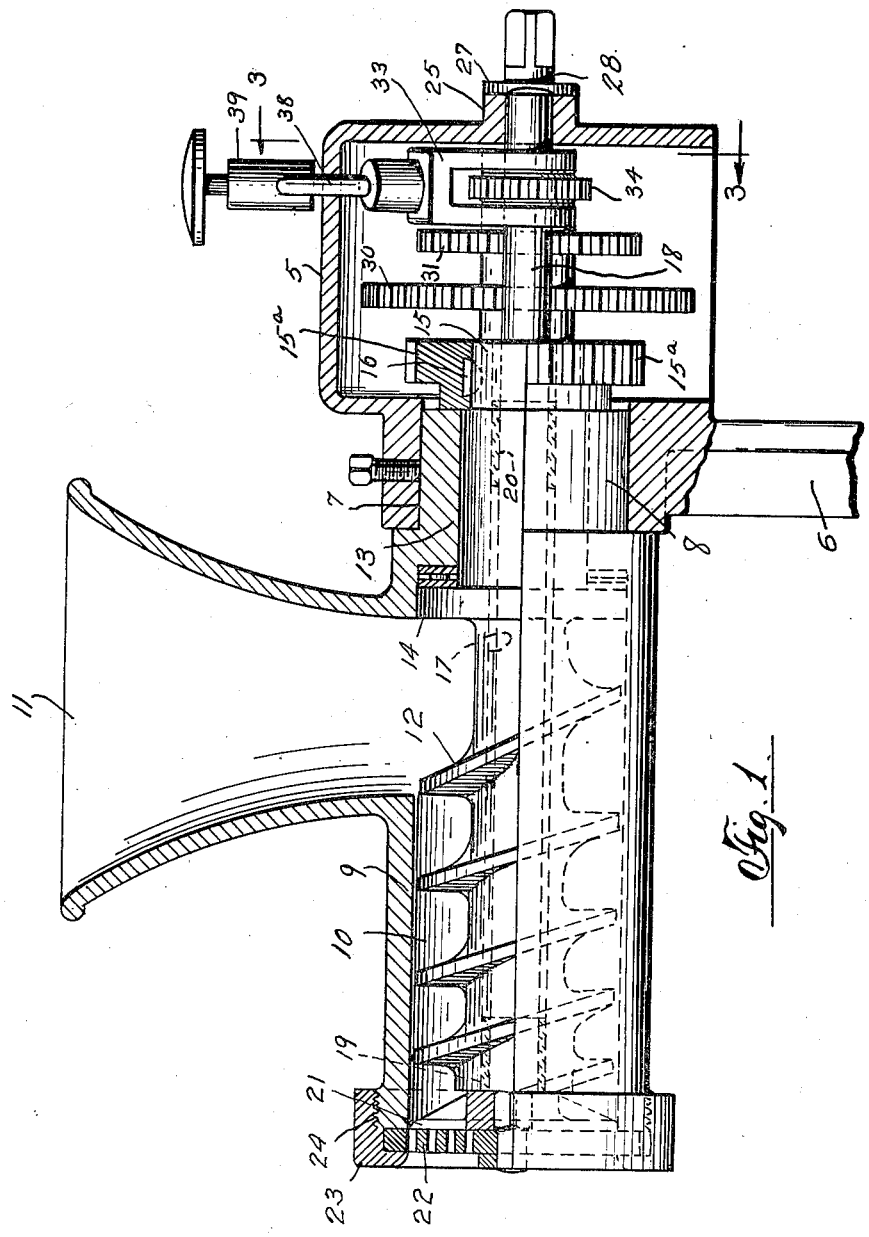
Fig. 1 is a vertical central section, partly in elevation, taken lengthwise of a chopping machine constructed according to my invention.

Referring to the drawings, my meat chopper consists of an outer housing or casing 5, provided with a downwardly depending foot 6, which provides means for securing the casing to a stationary support such as a bench or table, by means of screws or otherwise. Provided in one wall of casing 5 is an enlarged opening 7 and in this opening 7 is detachably secured the reduced end 8 of the chopper body 9. Provided within the body 9 is the feed worm chamber 10, upwardly from one end of which extends the feed hopper 11, integral with the body 9. Rotatably mounted within the body 9 is the feed worm 12, the rear end of which is rotatably mounted within the journal 13 provided in the end of the chamber 10, a thrust bearing 14 being also provided, the object of which will be obvious. The rear end 15 of the worm 12 extends beyond the end of the body 9 and is reduced in size, and on this reduced end is rigidly secured a spur gear 15ª, by means of the key 16. The worm 12 is provided with a central concentric passage 17 therethrough and in this passage is rotatably mounted a shaft 18, rotatable within the journals 19 and 20 at each end of said passage.

The forward end of this shaft 18 extends beyond the forward end of the worm and is squared for the reception of the cutting knife 21, and beyond this squared portion is reduced in size and rotatably mounted within a perforated plate or die 22, which die is mounted within a clamping ring 23, adjustably mounted on the front end of the body 9 by means of cooperating screw threads 24.

The rearmost end of shaft 18 projects beyond the end of the worm 12 and the end of this projecting portion is rotatably mounted within a trunnion 25 provided in the wall of the housing 5. Rotatably mounted in bearings 26 and 27 in opposite walls of the housing 5 is a stub shaft 28, which extends parallel with the shaft 18, and has one end projecting through said side wall and is then squared or otherwise prepared for the reception of a suitable rotating means such as a crank or pulley or the like. Rigidly mounted upon one end of the shaft 28 is a spur gear 29 which gear is in operative mesh with the gear 15ª and this gear provides means for rotating the worm 12 upon the rotation of the shaft 28.

Rigidly mounted upon the shaft 28 in spaced relation are the cutter or knife driving gears, of which I have shown three, although more or less may be used according to the number of changes desired or found necessary.

These gears comprise the high speed, or finest cutting gear 30; the intermediate speed, or medium cutting gear 31; and the low speed, or coarse cutting gear 32. It is understood, of course, that the shaft 18, and with it the cutter or knife 21, rotates in a direction opposite to that of the worm and that varying the relative speed of the cutter and worm will likewise vary the fineness of the chopped meat. Slidably and rotatably mounted upon the shaft 18, is a bifurcated, or forked, shifting lever 33, between the furcations of which is positioned a spur gear 34. Gear 34 is slidably but non-revolubly mounted upon shaft 18, by means of the key 35 and spline 36. One of the legs 33ᵃ of the member 33 is extended and rotatably mounted upon the side of this extended portion is a spur gear 37, in constant mesh with the gear 34 and adapted to be brought into mesh with either of the gears 30, 31 or 32, to operatively connect the shaft 18 to the shaft 28 whereby rotation will be transmitted from shaft 18 to shaft 28 at varying speeds according to the respective gears in mesh.

Extending upwardly from the upper end of the lever 33 is a substantially L-shaped arm 38 which projects through the side of the housing 5 and terminates in a vertically extending head 39. Provided within the head 39 is a piston chamber 40 and in this chamber is slidably mounted a piston 41 integral with the stem 42, intermediate its length. Coiled around the stem 42, between the upper face of the piston 41 and the upper end of the chamber 40 is a coiled spring 43, which normally acts to maintain said stem and piston in its lowermost position. The lower projecting end 44 of the stem 42 is adapted to be positioned within the holes 45 provided in the wall of the housing 5, to retain the shifting lever 33 in its adjusted position. Provided in the walls of the housing 5 is an angular slot 46 within which the projecting end of the arm 38 travels, recesses 47 being provided to permit said arm 38 to be moved to bring the gear 37 into mesh with the respective change speed gears 30, 31 or 32.

It will be obvious that by maintaining the rotation of the feed worm at a constant speed to feed the meat to the cutting knife at a uniform rate and varying the speed of rotation of the cutting knife in a direction reversely to the rotation of the feed worm the fineness of the portions into which the meat will be cut will be governed by the difference in speed of rotation between the worm and knife, the greater the variation the finer the cut and vice versa.

Having described my invention what I claim is:

1. A food chopper comprising a stationary support including a gear housing, a stationary casing provided with a food hopper in communication with the interior thereof removably mounted at one end in said support, a feed worm rotatably mounted within said stationary casing to extend lengthwise thereof having one end projecting into the gear housing and its other end terminating at a distance from the other end of the stationary casing, a cutter shaft rotatably mounted within said worm, centrally thereof and concentric therewith, one of the ends of said shaft extending across said gear housing and having its end rotatably mounted in the side wall thereof, a cutting knife removably mounted upon the other end of said shaft in front of said worm, an extrusion cutter in front of said knife, a drive shaft mounted in said gear housing parallel with said cutter shaft but spaced therefrom, a pair of gears connecting said drive shaft and said worm whereby rotation of said drive shaft will rotate said worm, a plurality of spur gears rigidly mounted on said drive shaft in spaced relation, a driven gear slidably mounted upon said cutter shaft within the gear housing, a shifting lever slidably mounted on said cutter shaft in juxtaposition with said driven gear and arranged to slide said gear along said shaft, an idler gear carried by said shifting lever in mesh with said driven gear and adapted to be brought into mesh with any one of said plurality of gears, whereby said cutter shaft is caused to rotate in a reverse direction to said feed worm and at varying speeds, and means for locking said shifting lever in any of its adjusted positions.

2. A food chopper comprising a stationary support including a gear housing, a stationary casing provided with a food hopper in communication with the interior thereof removably mounted at one end in said support, a feed worm rotatably mounted within said stationary casing to extend lengthwise thereof and having one end projecting into the gear housing and its other end terminating at a distance from the other end of the stationary casing, a cutter shaft rotatably mounted within said worm centrally thereof and concentric therewith, one end of said shaft projecting into said gear housing, a cutting knife mounted upon the other end of said shaft in front of said worm, an extrusion cutter in front of said knife, a drive shaft mounted in said gear housing, a pair of gears connecting said drive shaft and said worm whereby rotation is transmitted therebetween, a plurality of spur gears rigidly mounted on said drive shaft, a driven gear slidably mounted on said cutter shaft within the gear housing, a shifting lever slidably mounted upon said cutter shaft in juxtaposition to the driven gear and arranged to slide said gear along said shaft; an idler gear carried by said shifting lever in constant mesh with the driven gear and adapted to be brought into mesh with any one of said spur gears, and means for locking said shifting lever in its adjusted positions.

3. A food chopper comprising a stationary support including a gear housing, a stationary casing provided with a food hopper in communication with the interior thereof removably mounted at one end in said support, a feed worm rotatably mounted within said stationary casing to extend lengthwise thereof and having one end projecting into the gear housing and its other end terminating at a distance from the other end of the stationary casing, a cutter shaft rotatably mounted within said worm centrally thereof and concentric therewith, one end of said shaft projecting into said gear housing, a cutting knife mounted upon the other end of said shaft in front of said worm, an extrusion cutter in front of said knife, a drive shaft rotatably mounted in said gear housing, a pair of gears connecting said drive shaft and said worm whereby rotation is transmitted therebetween, a plurality of gears rigidly mounted on said drive shaft, a driven gear slidably mounted on said cutter shaft within the gear housing, a shifting lever slidably mounted upon said cutter shaft within the gear housing in juxtaposition to the driven gear and arranged to slide said gear along said shaft, an idler gear carried by said shifting lever in constant mesh with the driven gear and adapted to be brought into mesh with any one of said plurality of gears.

4. A food chopper comprising a stationary support including a gear housing, a stationary casing provided with a food hopper in communication with the interior thereof removably mounted at one end in said support, a feed worm rotatably mounted within said stationary casing to extend lengthwise thereof and having one end projecting into the gear housing and its other end terminating at a distance from the other end of the stationary casing, a cutter shaft rotatably mounted within said worm centrally thereof and concentric therewith, one end of said shaft projecting into said gear housing, a cutting knife carried by the other end of said cutter shaft at the front end of said worm, an extrusion plate in front of said knife, a drive shaft mounted in said gear housing, operative connections between said drive shaft and said worm, a plurality of spur gears mounted on said drive shaft rotatable therewith, a driven gear slidably but non-revolubly mounted upon said cutter shaft within the gear housing, a shifting lever slidably and revolubly mounted upon the cutter shaft in engagement with the driven gear and arranged to slide said driven gear along said shaft, an intermediate gear carried by the shifting lever in mesh with the driven gear and adapted to be brought into operative engagement with any one of the spur gears, locking means for retaining said shifting lever in its adjusted positions, and means to rotate said driving shaft.

JEAN R. YOTTA.